US011836930B2

(12) United States Patent
Mourão et al.

(10) Patent No.: US 11,836,930 B2
(45) Date of Patent: Dec. 5, 2023

(54) SLIP-TO-SLIP CONNECTION TIME ON OIL RIGS WITH COMPUTER VISION

(71) Applicant: Accenture Global Solutions Limited, Dublin (IE)

(72) Inventors: Adriano De Araújo Abreu Mourão, Belo Horizonte (BR); Hugo Zanini Gomes, Belo Horizonte (BR); Rogerio Cosendey Labanca, Belo Horizonte (BR); Rafael Soares Mendonça, São Paulo (BR); Paulo Henrique Barchi, Limeira (BR); Renato Mintz, Belo Horizonte (BR)

(73) Assignee: Accenture Global Solutions Limited, Dublin (IE)

( * ) Notice: Subject to any disclaimer, the term of this patent is extended or adjusted under 35 U.S.C. 154(b) by 67 days.

(21) Appl. No.: 17/532,516

(22) Filed: Nov. 22, 2021

(65) Prior Publication Data

US 2022/0172373 A1 Jun. 2, 2022

Related U.S. Application Data

(60) Provisional application No. 63/119,588, filed on Nov. 30, 2020.

(51) Int. Cl.
*G06T 7/20* (2017.01)
*G06T 7/00* (2017.01)
(Continued)

(52) U.S. Cl.
CPC .............. *G06T 7/20* (2013.01); *G06F 18/214* (2023.01); *G06N 20/00* (2019.01); *G06T 5/20* (2013.01);
(Continued)

(58) Field of Classification Search
CPC .............. G06T 7/20; G06T 7/0004; G06T 2207/30164; G06N 20/00; G06V 20/40; G06V 10/22; G06F 18/214
See application file for complete search history.

(56) References Cited

U.S. PATENT DOCUMENTS 9,464,492 B2 * 10/2016 Austefjord ............ B66C 13/085
11,215,033 B2 * 1/2022 Al Gharbi ............... G06F 16/84
(Continued)

FOREIGN PATENT DOCUMENTS

| CN | 107808129 A | * | 3/2018 | ......... G06K 9/00281 |
| WO | WO-2021041723 A1 | * | 3/2021 | |
| WO | WO-2021240650 A1 | * | 12/2021 | |

OTHER PUBLICATIONS

Hegde, Chiranth, Awan, Omar, and Tim Wiemers. "Application of Real-time Video Streaming and Analytics to Breakdown Rig Connection Process." Paper presented at the Offshore Technology Conference, Houston, Texas, USA, Apr. 2018. doi: https://doi.org/10.4043/28742-MS (Year: 2018).*

(Continued)

*Primary Examiner* — Michael Robert Cammarata
(74) *Attorney, Agent, or Firm* — Norton Rose Fulbright US LLP

(57) ABSTRACT

Aspects of the present disclosure provide systems, methods, and computer-readable storage media that support activity recognition using image or video processing (e.g., computer vision) and machine learning. To illustrate, a monitoring device may receive video data from a camera configured to capture video of a scene that includes a pipe of an oil rig. The monitoring device may perform motion detection on the video data to identify frames of the video data depicting motion. The identified frames may be provided to one or more machine learning models that are configured to determine whether the pipe is moving based on input video clips.

(Continued)

The one or more machine learning models may be trained using labeled video clips that depict movement of the pipe or lack thereof. The monitoring device may generate an output based on the determination, the output indicating a slip to slip time associated with the pipe.

18 Claims, 4 Drawing Sheets

(51) Int. Cl.
- *G06N 20/00* (2019.01)
- *G06V 10/22* (2022.01)
- *G06V 20/40* (2022.01)
- *G06F 18/214* (2023.01)
- *G06T 5/20* (2006.01)
- *G08B 21/18* (2006.01)

(52) U.S. Cl.
CPC ............ *G06T 7/0004* (2013.01); *G06V 10/22* (2022.01); *G06V 20/40* (2022.01); *G08B 21/18* (2013.01); *G06T 2200/24* (2013.01); *G06T 2207/10016* (2013.01); *G06T 2207/20081* (2013.01); *G06T 2207/20084* (2013.01); *G06T 2207/30164* (2013.01)

(56) References Cited

U.S. PATENT DOCUMENTS

| | | | | |
|---|---|---|---|---|
| 11,238,367 | B1* | 2/2022 | Liu | H04L 67/10 |
| 11,610,384 | B2* | 3/2023 | Sikka | G06V 10/255 |
| 2003/0011598 | A1* | 1/2003 | Klein | G06T 17/00 345/428 |
| 2014/0326505 | A1* | 11/2014 | Davis | E21B 44/02 175/24 |
| 2015/0114634 | A1* | 4/2015 | Limbacher | E21B 47/04 166/64 |
| 2015/0345261 | A1* | 12/2015 | Kruspe | E21B 47/16 175/40 |
| 2016/0130889 | A1* | 5/2016 | Torrione | E21B 19/20 348/135 |
| 2016/0130917 | A1* | 5/2016 | Torrione | G06V 20/00 348/85 |
| 2017/0167853 | A1* | 6/2017 | Zheng | E21B 19/06 |
| 2019/0100988 | A1* | 4/2019 | Ellis | E21B 17/006 |
| 2019/0136650 | A1* | 5/2019 | Zheng | E21B 44/00 |
| 2019/0206068 | A1* | 7/2019 | Stark | E21B 49/00 |
| 2019/0370980 | A1* | 12/2019 | Hollander | G06V 20/41 |
| 2020/0193609 | A1* | 6/2020 | Dharur | G06T 7/143 |
| 2021/0056709 | A1* | 2/2021 | Bagherinezhad | G06V 10/764 |
| 2021/0366256 | A1* | 11/2021 | Michalopulos | E21B 44/00 |
| 2022/0172373 | A1* | 6/2022 | Mourão | G06T 5/20 |
| 2022/0198711 | A1* | 6/2022 | Mayer | G06N 3/045 |
| 2023/0083161 | A1* | 3/2023 | Salameh | G06N 20/00 |
| 2023/0206615 | A1* | 6/2023 | Zhang | G06V 10/764 382/103 |

OTHER PUBLICATIONS

Chatar, Crispin, Suresha, Suhas, Shao, Laetitia, Gupta, Soumya, and Indranil Roychoudhury. "Determining Rig State from Computer Vision Analytics." Paper presented at the SPE/IADC International Drilling Conference and Exhibition, Virtual, Mar. 2021. doi: https://doi.org/10.2118/204086-MS (Year: 2021).*

C. P. Gooneratne, A. Magana-Mora, M. Affleck, W. C. Otalvora, G. D. Zhan and T. E. Moellendick, "Camera-Based Edge Analytics for Drilling Optimization," 2020 IEEE International Conference on Edge Computing (EDGE), Beijing, China, 2020, pp. 111-115, doi: 10.1109/EDGE50951.2020.00024. (Year: 2020).*

C. Savitha and D. Ramesh, "Motion detection in video surveillance: A systematic survey," 2018 2nd International Conference on Inventive Systems and Control (ICISC), Coimbatore, India, 2018, pp. 51-54, doi: 10.1109/ICISC.2018.8398880. (Year: 2018).*

Coley, Christopher "Building a Rig State Classifier Using Supervised Machine Learning to Support Invisible Lost Time Analysis." Paper presented at the SPE/IADC International Drilling Conference and Exhibition, The Hague, The Netherlands, Mar. 2019. doi: https://doi.org/10.2118/194136-MS (Year: 2019).*

De Oliveira, Gabriel L., Zank, et al. "Offshore Drilling Improvement Through Automating the Rig State Detection Process—Implementation Process History and Proven Success." IADC/SPE Drilling Conf., Fort Worth, Texas, USA, Mar. 2016. doi: https://doi.org/10.2118/178775-MS (Year: 2016).*

Noshi, Christine I., and Jerome J. Schubert. "The Role of Machine Learning in Drilling Operations; A Review." Paper presented at the SPE/AAPG Eastern Regional Meeting, Pittsburgh, Pennsylvania, USA, Oct. 2018. doi: https://doi.org/10.2118/191823-18ERM-MS (Year: 2018).*

* cited by examiner

SLIP-TO-SLIP CONNECTION TIME ON OIL RIGS WITH COMPUTER VISION

CROSS-REFERENCE TO RELATED APPLICATIONS

The present application claims the benefit of priority from U.S. Provisional Application No. 63/119,588 filed Nov. 30, 2020 and entitled "IMPROVING SLIP-TO-SLIP CONNECTION TIME ON OIL RIGS WITH COMPUTER VISION," the disclosure of which is incorporated by reference herein in its entirety.

TECHNICAL FIELD

The present disclosure relates generally to performing activity recognition using computer vision and machine learning, particularly activity recognition at an oil rig or other industrial setting.

BACKGROUND

Key performance indicators (KPIs) measure if a particular process or action is effectively accomplishing defined goals for an entity that implements the particular process or action. KPIs may be used by the entity to determine the effectiveness of a process, and whether or not to continue performance of the process or to modify the process to improve the effectiveness. One of the main KPIs associated with offshore oil rigs is the slip to slip connection time. The slip to slip connection time is associated with pipes (e.g., drill pipes) that are attached to a drill supported by the oil rig and configured to drill a hole in the ground in order to extract oil into the pipe. The slip to slip connection time refers to an amount of time (e.g., a time interval) from securing a first drill pipe to an oil rig, via a slip, to disconnecting the slip from the first drill pipe. The slip is disconnected from the first drill pipe after a second drill pipe is connected to the first drill pipe while the first drill pipe is secured via the slip. Conventional sensors on the oil rig may measure the overall time of an entire slip to slip process. For example, conventional sensors may be able to measure a time interval during which a rig worker retrieves the slip, connects the slip to the first drill pipe to stop movement of the first drill pipe, connects the second drill pipe to the first drill pipe, and removes the slip, and the first drill pipe and the second drill pipe begin to move (e.g., are lowered for insertion into the hole in the ground). However, installation of these sensors at the oil rig is expensive, and the sensors are unable to provide sufficient information to divide the slip to slip process into smaller activities, which may be necessary in determining KPIs. Thus, conventional sensors may not provide sufficient granularity of information relating to the slip to slip process to enable determination of desired KPIs.

SUMMARY

Aspects of the present disclosure provide systems, methods, apparatus, and computer-readable storage media that support activity recognition using image/video processing (e.g., computer vision) and machine learning. In some aspects, a system may receive video data, such as from a camera, and perform motion detection to identify frames of the video data in which motion is detected. The identified frames may be provided to a machine learning (ML) model that is trained to determine whether a particular activity is occurring in input video clips. For example, the ML model may include or correspond to a convolutional neural network (CNN) that is trained using labeled training data based on video clips that depict the particular activity and video clips that do not depict the particular activity. Optional pre-processing and post-processing may be performed during training or during use of the ML model to improve the efficiency and accuracy of the ML model. In a particular, non-limiting implementation described herein, the system may be configured to determine whether a pipe of an oil rig is moving based on video clips that depict the pipe. Determining the movement of the pipe enables determination of the slip to slip time at a finer granularity than sensor-based systems, which may enable determination of relevant key performance indicators (KPIs) for an entity that owns or operates the oil rig. Although described in the context of detecting movement of a pipe for determining the slip to slip time, the techniques described herein may be implemented to recognize other activities, such as location of a worker within an unauthorized area of the oil rig, or in other contexts, such as for other industrial machinery or manufacturing systems.

In some aspects, a system may include a monitoring device that includes or has access to a ML model that is trained to determine whether the pipe is moving in an input video clip. For example, the ML model may be trained based on a first plurality of labeled video clips that depict movement of the pipe and a second plurality of labeled video clips that depict no movement of the pipe. In some implementations, the system may be configured to perform data augmentation on the first plurality of labeled video clips, the second plurality of labeled video clips, or both, to generate additional labeled video clips for training the ML model. In some implementations, the ML model may include a CNN, such as a CNN that includes three convolutional layers, each followed by a spatial dropout layer, and three fully connected layers.

The monitoring device may receive video data from a camera located at the oil rig, such as a security camera or a dedicated camera. The monitoring device may perform motion detection on the video data to identify frames in which motion is detected. In some implementations, the motion detection may be performed by determining a difference between pixel intensity values of a set of one or more pixels in a first frame and pixel intensity values of the set of pixels in a second frame, and if the difference satisfies a threshold, detecting motion in a region of the two frames corresponding to the set of pixels. Performing motion detection prior to providing input to the ML model may reduce complexity of the ML model as compared to an ML model that is trained to identify movement of the pipe in video clips regardless of whether motion is detected. After performing the motion detection, the monitoring device may provide the identified frames as input data to the ML model to determine whether the pipe is moving during a time period corresponding to the received video data. In some implementations, pre-processing, post-processing, or both may be performed to improve efficiency, improve accuracy, or reduce complexity of the ML model. After determining whether the pipe is moving, the monitoring device may generate an output based on the determination. For example, the output may indicate a slip to slip time that is determined based on a detected transition from movement to no movement and a detected transition from no movement to movement. Such an output may include video clips corresponding to the slip to slip time, or other video clips. Additionally or alternatively, the output may include or correspond to an alert or an instruction to cause performance of one or more operations at an automated or semi-automated control system of the oil rig.

The present disclosure describes systems, methods, apparatus, and computer-readable media that provide benefits compared to conventional sensor-based monitoring systems. For example, the present disclosure supports activity recognition for an oil rig (or other industrial equipment) using image/video analysis (e.g., computer vision) and machine learning. For example, trained ML model(s) may determine whether a pipe is moving in a video clip received from a camera. Determining when the pipe is moving, and intervals between time periods of movement (e.g., the slip to slip time), may enable an entity that operates the oil rig to determine the effectiveness of operations at the oil rig. For example, if the slip to slip time is greater than a threshold, workers may be inefficiently performing one or more activities. This information enables the entity to determine a KPI, which may be used in determining whether to provide workers with additional training or to modify one or more required activities. Additionally or alternatively, because the activity recognition is performed using computer vision, the techniques described herein may be implemented at oil rigs with previously-installed cameras, such as security cameras, without requiring installation of expensive sensors or automated control systems.

In a particular aspect, a method for detecting motion of a pipe of an oil rig based on video analysis and machine learning includes obtaining, by one or more processors, video data associated with a pipe on an oil rig. The method also includes detecting, by the one or more processors, motion in one or more regions within one or more frames of the video data. The method includes providing, by the one or more processors, the one or more frames to one or more machine learning (ML) models to determine whether the pipe is moving during a time period associated with the one or more frames. The one or more ML models are configured to determine whether the pipe is moving based on input video data. The method further includes generating, by the one or more processors, an output indicating whether the pipe is moving during the time period.

In another particular aspect, a system for detecting motion of a pipe of an oil rig based on video analysis and machine learning includes a camera configured to capture video data associated with a pipe on an oil rig. The system also includes a memory and one or more processors communicatively coupled to the memory and the camera. The one or more processor are configured to receive the video data from the camera. The one or more processors are also configured to detect motion in one or more regions within one or more frames of the video data. The one or more processors are configured to provide the one or more frames to one or more ML models to determine whether the pipe is moving during a time period associated with the one or more frames. The one or more ML models are configured to determine whether the pipe is moving based on input video data. The one or more processors are further configured to generate an output indicating whether the pipe is moving during the time period.

In another particular aspect, a non-transitory computer-readable storage medium stores instructions that, when executed by one or more processors, cause the one or more processors to perform operations for detecting motion of a pipe of an oil rig based on video analysis and machine learning. The operations include obtaining video data associated with a pipe on an oil rig. The operations also include detecting motion in one or more regions within one or more frames of the video data. The operations include providing the one or more frames to one or more ML models to determine whether the pipe is moving during a time period associated with the one or more frames. The one or more ML models are configured to determine whether the pipe is moving based on input video data. The operations further include generating an output indicating whether the pipe is moving during the time period.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, apparatus, and computer-readable storage media that support performing activity recognition using computer vision (e.g., image or video processing) and machine learning. In some aspects, the present disclosure provides an adaptable framework (e.g., infrastructure) for providing drilling platforms (e.g., oil rigs) with new capabilities without requiring special hardware, such as a variety of sensors.

Instead, the adaptable framework may be implemented on an oil rig (or in the context of other industrial machinery or manufacturing equipment) that has a previously-installed camera, such as a security camera (or by installation of one or more additional cameras). The systems and methods described herein provide new capabilities to drilling platforms using computer vision and machine learning technologies. As an example, the systems and methods described herein may enable identification and measurement of a slip to slip time associated with a pipe of an oil rig. Additionally or alternatively, the adaptable framework described herein may be modified to recognize other activities primarily through additional training of machine learning models, instead of requiring installation of expensive, activity-specific sensors and equipment.

Figure 1:
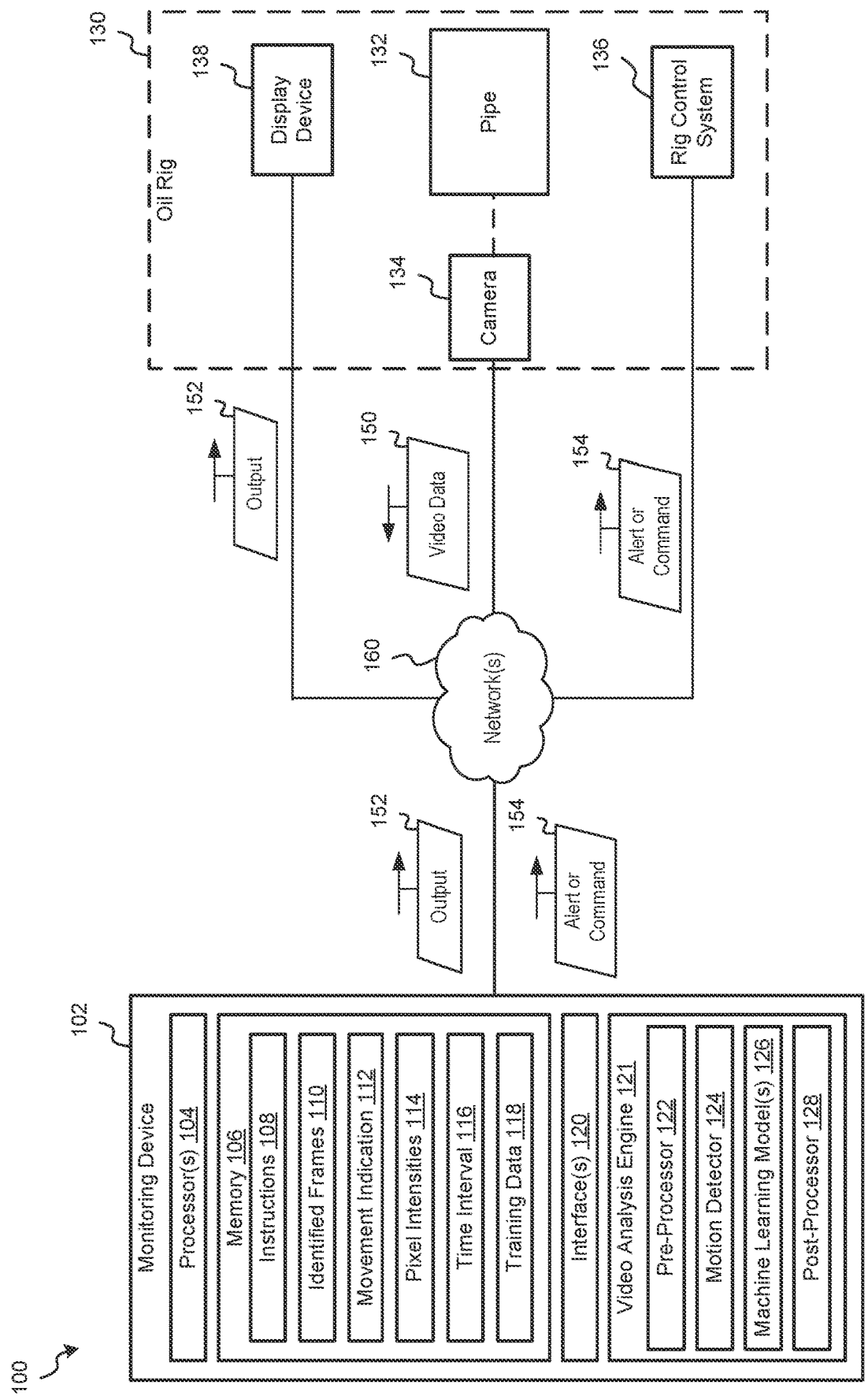
FIG. 1 is a block diagram of an example of a system that supports activity recognition using image analysis and machine learning according to one or more aspects.

Referring to FIG. 1, an example of a system that supports activity recognition using image analysis and machine learning according to one or more aspects is shown as a system 100. The system 100 may be configured to analyze video of a particular piece of industrial machinery or equipment to determine whether a particular activity is occurring. In a particular, non-limiting example described with reference to FIG. 1, the industrial equipment includes or corresponds to an oil rig, and the particular activity includes or corresponds to movement of a pipe that is used to determine a slip to slip connection time. In some other implementations, the system 100 may be configured to analyze video of other types of industrial equipment, such as construction equipment, manufacturing equipment (e.g., assembly lines and the like), oil and gas pipelines, commercial or industrial vehicles, telecommunications equipment, or the like. Additionally or alternatively, the particular activity may include monitoring a particular location at the oil rig (e.g., a "danger zone") to determine if employees are within the danger zone for more than a threshold period of time, monitoring for a quantity of stored supplies at the oil rig, or monitoring for presence of a threshold number of employees within a particular location at the oil rig, as non-limiting examples. As shown in FIG. 1, the system 100 includes a monitoring device 102, an oil rig 130, and one or more networks 160. The oil rig 130 includes a pipe 132, a camera 134 (or multiple cameras), a rig control system 136, and a display device 138. Although illustrated in FIG. 1 as a distinct component, in some other implementations, the display device 138 may be included in or integrated within either the rig control system 136 or the monitoring device 102. In some implementations, one or more of the components of the oil rig 130 may be optional, such as the rig control system 136 or the display device 138, or the system 100 may include additional components, such as equipment sensors, environmental sensors, or user devices (e.g., employee devices), as non-limiting examples.

The monitoring device 102 (e.g., an electronic device or a monitoring station) may include or correspond to a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. The monitoring device 102 includes one or more processors 104, a memory 106, one or more communication interfaces 120, and a video analysis engine 121. The video analysis engine 121 includes a pre-processor 122, a motion detector 124, one or more machine learning (ML) models 126, and a post-processor 128. In some other implementations, one or more of the components 122-128 may be optional (e.g., the pre-processor 122, the post-processor 128, or both), one or more additional components may be included in the monitoring device 102 (or the video analysis engine 121), or both. It is noted that functionalities described with reference to the monitoring device 102 are provided for purposes of illustration, rather than by way of limitation and that the exemplary functionalities described herein may be provided via other types of computing resource deployments. For example, in some implementations, computing resources and functionality described in connection with the monitoring device 102 may be provided in a distributed system using multiple servers or other computing devices, or in a cloud-based system using computing resources and functionality provided by a cloud-based environment that is accessible over a network, such as the one of the one or more networks 160. To illustrate, one or more operations described herein with reference to the monitoring device 102 may be performed by one or more servers or a cloud-based system that communicates with one or more oil rig systems or user devices.

The one or more processors 104 may include one or more microcontrollers, application specific integrated circuits (ASICs), field programmable gate arrays (FPGAs), central processing units (CPUs) having one or more processing cores, or other circuitry and logic configured to facilitate the operations of the monitoring device 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the monitoring device 102 may be stored in the memory 106 as instructions 108 that, when executed by the one or more processors 104, cause the one or more processors 104 to perform the operations described herein with respect to the monitoring device 102, as described in more detail below. Additionally, the memory 106 may be configured to store data and information, such as identified frames 110, a movement indication 112, pixel intensities 114, a time interval 116, and training data 118. Illustrative aspects of the identified frames 110, the movement indication 112, the pixel intensities 114, the time interval 116, and the training data 118 are described in more detail below.

The one or more communication interfaces 120 may be configured to communicatively couple the monitoring device 102 to the one or more networks 160 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the monitoring device 102 includes one or more input/output (I/O) devices that include one or more display devices, a keyboard, a stylus, one or more touchscreens, a mouse, a trackpad, a microphone, a camera, one or more speakers, haptic feedback devices, or other types of devices that enable a user to receive information from or provide information to the monitoring device 102. In some implementations, the monitoring device 102 is coupled to the display device 138, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device 138 is included in or integrated in the monitoring device 102 or the rig control system 136.

The video analysis engine 121 is configured to analyze video clips received from one or more sources, such as the camera 134 or a video database, and based on the analysis, to determine whether the pipe 132 is moving during time periods associated with the video clips. The video analysis engine 121 may be configured to perform pre-processing on the video clips, to detect motion in the video clips, to extract features from frames of the video clips in which motion is detected (e.g., video clips containing motion), to determine whether the pipe 132 is moving in the video clips based on the extracted features, to perform post-processing on the video clips, or a combination thereof. In some implementations, one or more of the operations of the video analysis engine 121 may be performed by the pre-processor 122, the motion detector 124, the one or more ML models 126, the post-processor 128, or a combination thereof.

The pre-processor 122 is configured to perform pre-processing operations on video content received by the monitoring device 102 (e.g., to be used to for activity recognition or for training). In some implementations, the pre-processing operations may include filtering operations, pixel value normalization operations, frame resizing operations, other operations, or a combination thereof. For example, the pre-processor 122 may be configured to apply a filter to frames of video data, such as a contrast limited adaptive histogram equalization (CLAHE) filter, as a non-limiting example. As another example, the pre-processor 122 may be configured to normalize pixel values across different frames of the video data. As another example, the pre-processor 122 may be configured to resize one or more frames of the video data such that each frame of the video data has a common size. As another example, the pre-processor 122 may be configured to crop frames of the video data such that a particular focal point (e.g., the pipe 132) is approximately centered within the frames. In some implementations, the pre-processor 122 may be configured to perform the pre-processing operations using a particular code library, such as the opencv library for python, as a non-limiting example.

The motion detector 124 is configured to detect motion across multiple frames of video content. To illustrate, the motion detector 124 may be configured to compare pixel intensity values between corresponding pixels in different frames, and if a different pixel intensity values satisfies (e.g., is greater than or equal to) a threshold, motion may be detected between the frames. For example, the motion detector 124 may be configured to generate a color map where each color intensity value represents a difference between pixel intensity values for a corresponding pixel in two frames, and regions of one or more pixels that have color intensity values that satisfy a color intensity threshold may be indicated as regions in which motion is detected. The motion detector 124 may be configured to identify multiple frames (e.g., the identified frames 110) in which motion is detected in one or more regions. In some implementations, the motion detector 124 may be configured to perform one or more object detection operations on frames of the video content, such as edge detection, object detection, and the like, and the regions (e.g., sub-images) corresponding to edges, surfaces, or objects may be identified for detecting motion, which may reduce complexity of the motion detection. Alternatively, the motion detection may identify motion of edges, surfaces, or objects within the frames, and the regions may be identified as those that include the edges, surfaces, or objects. Although motion detection based on pixel intensity differences is described, in some other implementations, the motion detector 124 may be configured to detect motion using other techniques or algorithms.

The video analysis engine 121 may be configured to extract features from the identified frames 110 to use in determining whether the pipe 132 is moving during a time period associated with the identified frames 110. To illustrate, the video analysis engine 121 may be configured to extract one or more predefined features, such as intensity values, color values, or the like of particular pixels, detected edges, gradients, or other features from the identified frames 110 (or regions thereof) for use in generating input data for the one or more ML models 126 to perform activity recognition. Alternatively, the identified frames 110 (or regions thereof) may be provided as input data to the one or more ML models 126, and the one or more ML models 126 may be configured to extract the features in addition to using the features to perform activity recognition.

In some implementations, the one or more ML models 126 (referred to herein as the ML models 126) may include a single ML model or multiple ML models configured to perform activity recognition based on input video data (or extracted features thereof). In some implementations, the ML models 126 may be implemented as one or more neural networks. For example, the ML models 126 may include or correspond to a convolutional neural network (CNN). In a particular, non-limiting example, the ML models 126 include or correspond to a single CNN that includes three convolutional layers, each followed by a spatial dropout layer, and three fully connected layers. As another particular, non-limiting example, the ML models 126 may include a CNN combined with a long short-term memory (LSTM) neural network. In some other implementations, the ML models 126 may be implemented as other types of ML models or constructs, such as support vector machines (SVMs), decision trees, random forests, regression models, Bayesian networks (BNs), dynamic Bayesian networks (DBNs), naive Bayes (NB) models, Gaussian processes, hidden Markov models (HMMs), regression models, and the like. The ML models 126 may be trained to perform activity recognition using unsupervised learning techniques, semi-supervised learning techniques, supervised learning techniques, or a combination thereof. In the particular example shown in FIG. 1, the activity recognition includes determining whether the pipe 132 is moving, as further described herein. In some implementations, the monitoring device 102 may train the ML models 126. In some other implementations, the monitoring device 102 may receive the trained ML models 126 (or parameters and hyper-parameters associated with a particular configuration of one or more trained ML models) from another device.

The post-processor 128 is configured to perform post-processing operations on the video content received by the monitoring device 102 and used to perform the activity recognition. In some implementations, the post-processing operations may include applying a low-pass filter to video data to discard high-frequency transitions between recognition of activity and no activity and identifying a transition by reanalyzing a respective mean of each of multiple batches of frames based on an overall indication of transition associated with the multiple batches of frames. For example, application of the low-pass filter may identify and discard recognition of activity if the recognition transitions between activity and no activity (or between no activity and activity) at least twice in two consecutive frames, in three consecutive frames, or in five consecutive frames, as non-limiting examples. As another example, the low-pass filter may be applied in batches of three processed frames, and for every two batches of frames, if there is an overall agreement towards a transition, the mean of each of the two batches is reanalyzed to identify the transition (e.g., between activity and no activity or between no activity and activity). Video data resulting from the post-processing may be used as output video data by the video analysis engine 121.

As shown in FIG. 1, the oil rig 130 includes the pipe 132, the camera 134, the rig control system 136, and the display device 138. The oil rig 130 may also include additional components not shown in FIG. 1, such as a drill, other pipes, a reservoir, one or more pumps, or other equipment or components. The pipe 132 may be coupled to a hole in the ground that is drilled to access a subterranean oil reserve, and the pipe 132 may be configured to enable oil to flow from the hole to other pipelines configured to transport the oil to other locations, and optionally to one or more reservoirs or other storage on the oil rig 130. In some implementations, a process of installing the pipe 132 may include an initial piece of pipe being held by a clamp of the oil rig 130 and moved to insert the pipe 132 into the drilled hole in the ground. When substantially an entirety of the pipe 132 is inserted into the ground, worker at the oil rig 130 may place a slip on the pipe 132 to hold the pipe 132 in place while an additional piece of pipe is connected to the pipe 132. Once the pipes are connected, the slip is removed, and the combined pipe continues to be moved to be further inserted into the drilled hole. The time interval between movement (e.g., between placement of the slip and removal of the slip) is referred to as the slip to slip time. The camera 134 may include a digital video camera or other type of camera or image capture device that is capable of capturing and sharing the video data 150. In some implementations, the camera 134 may include one or more security cameras that are already installed at the oil rig 130 for security monitoring purposes.

The rig control system 136 may include or correspond to an automated or semi-automated control system for the oil rig 130 (or one or more components thereof). For example, the rig control system 136 may include one or more controllers (e.g., one or more processors), one or more memories, one or more actuators, one or more motors, or the like, that are coupled to components of the oil rig 130 and configured to control operations of or associated with the one or more components. For example, the rig control system 136 may be configured to activate or deactivate a drill, to activate or deactivate one or more motors to assist in moving the pipe 132, to activate one or more pumps or other components to cause oil to flow through the pipe 132, or the like. The rig control system 136 may operate independently of a user (e.g., fully automated) or based on some user input (e.g., semi-automated). In some implementations, the rig control system 136 may include one or more sensors, such as position sensors, temperature sensors, pressure sensors, lasers, or the like, configured to measure operations performed by the oil rig 130, the environment of the oil rig 130, status of the oil rig 130, or the like. In some such implementations, sensor data from these sensors may be provided to the monitoring device 102 to be used in activity recognition, as further described herein. The display device 138 may be configured to display information from the rig control system 136, such as control information associated with the oil rig 130 and sensor data from sensors of the rig control system 136. Additionally or alternatively, the display device 138 may be configured to display video data received from the camera 134. As described above, the display device 138 may be external to the rig control system 136 or included in or integrated within the rig control system 136.

During operation of the system 100, the camera 134 may capture video at the oil rig 130 to be used in activity recognition by the monitoring device 102. In the particular example shown in FIG. 1, the camera 134 may capture video of a portion of the oil rig 130 that includes the pipe 132 to generate video data 150. The camera 134 may provide the video data 150 to the monitoring device 102, such as via the networks 160. The monitoring device 102 may analyze the video data 150 (e.g., using the video analysis engine 121) to determine whether a particular activity is recognized during a time period associated with the video data 150. In the particular example shown in FIG. 1, the monitoring device 102 may analyze the video data 150 to determine whether the pipe 132 moves during the time period. For example, the pipe 132 may move as a motor aboard the oil rig 130 lowers the pipe 132 to insert the pipe 132 into a hole drilled in the ground. As another example, the pipe 132 may not move when a worker attaches a slip to the pipe 132 to prevent movement while an additional pipe is connected (e.g., during the slip to slip time/process). Although the monitoring device 102 is described as performing the activity recognition (e.g., determining whether the pipe 132 moves) based on the video data 150 received from the camera 134, in some other implementations (e.g., when non-real-time activity recognition is permissible), the monitoring device 102 may perform activity recognition on video data received from other sources, such as a multimedia database, as a non-limiting example.

The motion detector 124 may detect motion in one or more regions within one or more frames of the video data 150. For example, the motion detector 124 may detect motion in the identified frames 110 of the video data 150. In some implementations, the motion detector 124 may generate or access the pixel intensities 114 associated with the video data 150 to compare intensity values associated with corresponding pixels in different frames to determine differences in intensity values between the different frames. In some such implementations, based on a determination that one or more pixels are associated with differences that satisfy a threshold, the motion detector 124 may detect motion and identify the frames (or regions thereof) that include the one or more pixels as the identified frames 110.

In some implementations, prior to the motion detector 124 performing motion detection on the video data 150, the pre-processor 122 may perform one or more pre-processing operations on the video data 150. For example, the pre-processor 122 may apply one or more filters, such as a CLAHE filter, to the video data 150, normalize pixel values across frames of the video data 150, resize at least one frame of the video data 150, or a combination thereof. After pre-processing, the video data 150 may be provided to the motion detector 124.

After detecting the motion in the identified frames 110, the identified frames 110 (or regions thereof) may be provided to the ML models 126 for activity recognition. For example, the ML models 126 may be trained to determine whether the pipe 132 is moving in input video data, and the identified frames 110 may be provided to the ML models 126 as input video data. The ML models 126 may generate the movement indication 112 (e.g., an indicator, such as a flag or a different type of indicator) that indicates whether the pipe 132 is moving in the identified frames 110. As a non-limiting example, the movement indication 112 may be a flag having a first value if movement of the pipe 132 is identified by the ML models 126 and a second value if no movement of the pipe 132 is identified by the ML models 126. Based on the lack of detected movement in the remaining frames of the video data 150 (e.g., the frames not included in the identified frames 110), the remaining frames may be identified as corresponding to no movement of the pipe 132. Alternatively, the entirety of the video data 150 may be provided as input data to the ML models 126, although this may require more time and processing resources for the activity recognition.

In some implementations, determination of whether the pipe 132 is moving (e.g., activity recognition) may be performed in real-time/substantially real-time (e.g., accounting for processing needs of the various aspects being utilized). For example, by using a relatively simple configuration for the ML models 126 (e.g., nine total layers, only three convolutional layers) and by training the ML models 126 using a large volume of training data (e.g., approximately 21,000 video clips in some implementations), the ML models 126 may be configured to determine whether the pipe 132 is moving quickly (e.g., in real-time/substantially real-time) and with a high accuracy rate, unlike conventional video analysis techniques not based on ML and AI.

In some implementations, after generation of the movement indication 112, the post-processor 128 may perform one or more post-processing operations on the video data 150 or the movement indication 112 (or additional movement indications corresponding to other frames of video data). For example, the post-processor may apply a low-pass filter to discard high-frequency transitions (e.g., from non-movement to movement, or from movement to non-movement, of the pipe 132), which may include identifying transitions that are not the result of noise or artifacts in the video data 150 by reanalyzing batches of multiple frames of the video data 150.

After determining whether the pipe 132 is moving (e.g., generating the movement indication 112), the monitoring device 102 may generate an output 152 that indicates whether the pipe 132 is moving during the time period corresponding to the video data 150. For example, the output 152 may be based on (or include or indicate) the movement indication 112. In some implementations, the output 152 may be used to cause display of a user interface (UI), such as a graphical user interface (GUI). To illustrate, the monitoring device 102 may transmit the output 152 to the display device 138 to cause the display device 138 to display a GUI that includes information associated with the state of the pipe 132. For example, the GUI may include a time when the pipe 132 started moving, a time when the pipe 132 stopped moving, a duration of the time interval 116 between consecutive movements (e.g., time periods of movement) of the pipe 132, a duration of the pipe 132 moving, a duration of the pipe 132 remaining stable (e.g., not moving), other information, or a combination thereof. In some implementations, the GUI may include one or more video clips based on the video data 150, such as a video clip corresponding to the time interval 116 (e.g., the time period between consecutive movements of the pipe 132), as a non-limiting example. Additionally or alternatively, the monitoring device 102 may generate other outputs based on the movement indication 112 (e.g., based on whether the pipe 132 was moving or not moving during the time period corresponding to the video data 150, based on the time interval 116, etc.). For example, the monitoring device 102 may generate and transmit an alert or command 154 to the rig control system 136. The alert or command 154 may cause the rig control system 136 to perform an operation, such as lowering or raising the pipe 132, moving a crane or other equipment carrying additional pipe, initiating one or more sensors, other operations, or a combination thereof.

In some implementations, prior to receiving the video data 150, the monitoring device 102 may train the ML models 126 to perform activity recognition (e.g., to determine whether the pipe 132 is moving in video clips). For example, the monitoring device 102 may extract features from labeled video clips corresponding to movement of the pipe 132 (e.g., labeled video clips containing movement of the pipe 132) and labeled video clips corresponding to no movement of the pipe 132 (e.g., labeled video clips containing the pipe 132 remaining stationary) to generate the training data 118. The monitoring device 102 may provide the training data 118 to the ML models 126 to train the ML models 126 to determine whether the pipe 132 is moving based on input video clips (or extracted features thereof). In some implementations, the monitoring device 102 may receive a set of video clips to be used as the training data 118, and the monitoring device 102 may perform data augmentation on the set of video clips to increase the quantity of video clips used to generate the training data 118. To illustrate, the monitoring device 102 may perform one or more image modification operations on labeled video clips corresponding to movement of the pipe 132, labeled video clips corresponding to no movement of the pipe 132, or both, to generate additional labeled video clips (e.g., having the same labels as the original video clips) for use in generating the training data 118. The image modification operations may include horizontal flipping, rotating, translating, shearing, rescaling, resizing, reshaping, applying filters, or applying noise, as non-limiting examples. Increasing the quantity of video clips to be used in generating the training data 118 using image modification operations may improve the effectiveness of the training (e.g., associated with a higher accuracy) without requiring additional user input.

As described above, the system 100 supports activity recognition using image/video analysis (e.g., computer vision) and machine learning. For example, the ML models 126 may determine whether the pipe 132 is moving (e.g., recognize activity) based on video data from the camera 134. Determining when the pipe 132 is moving, and intervals between time periods of movement (e.g., the slip to slip time), may enable an entity that operates the oil rig 130 to determine the effectiveness of operations at the oil rig 130. For example, if the slip to slip time is greater than a threshold, workers may be inefficiently connecting an additional pipe to the pipe 132 or an automated or semi-automated operation of the rig control system 136 may be performing sub-optimally. This information enables the entity to run diagnostics of the rig control system 136, to provide the workers with additional training, or to implement new instructions for adding additional pipes. Because the system 100 determines whether the pipe 132 is moving based on video data, the system 100 may be implemented in older oil rigs that may not include semi-automated or automated control systems but that do have a security camera (or other video capture device). Additionally, through appropriate design and sufficient training of the ML models 126, the system 100 may enable activity recognition in real-time/substantially real-time, thus enabling the system 100 to be used during operation of the oil rig 130 instead of during scheduled down time.

Figure 2:
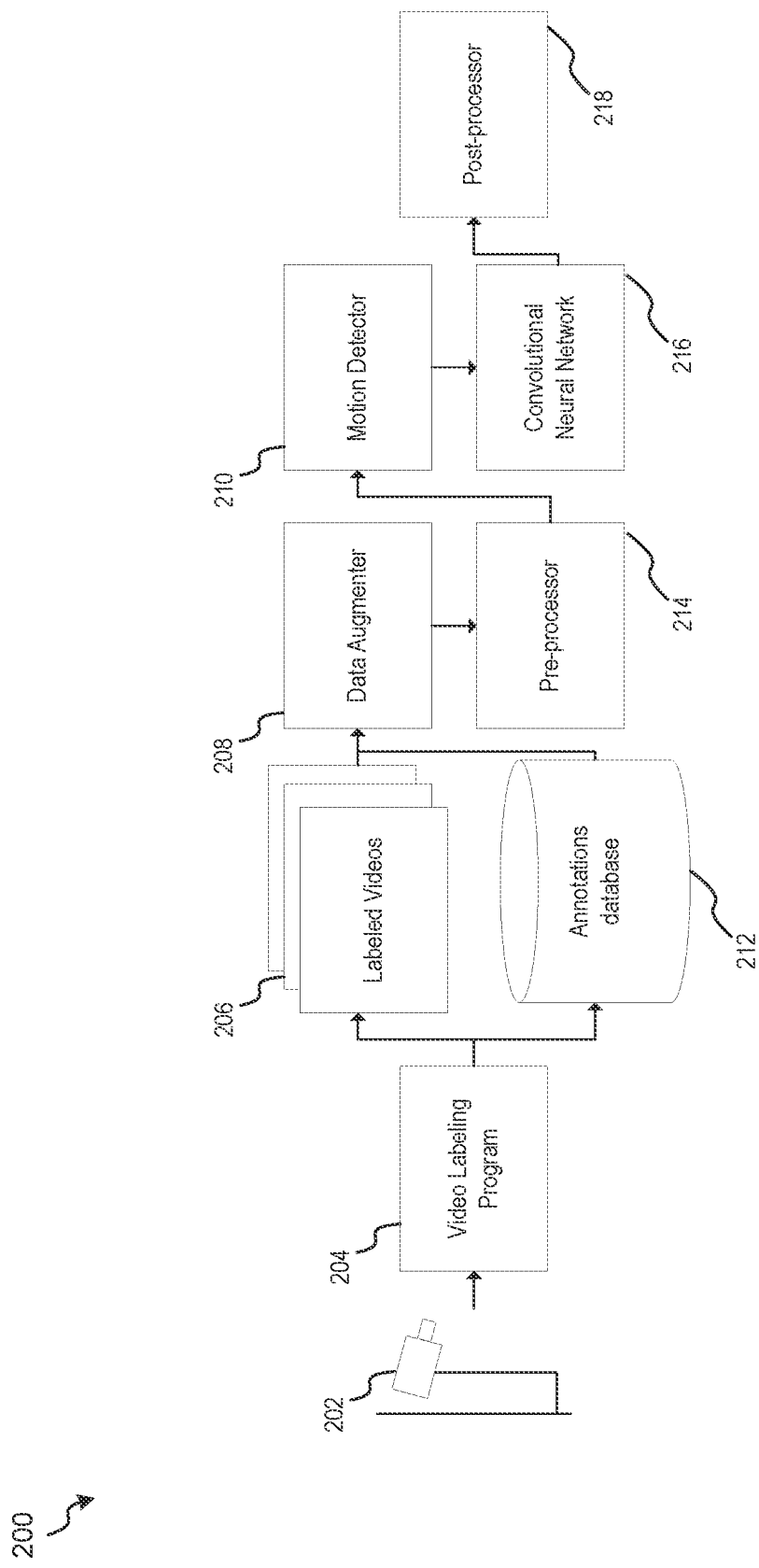
FIG. 2 is a block diagram of an example of a system that supports training a machine learning model to perform activity recognition according to one or more aspects.

FIG. 2 illustrates an example of a system 200 that supports training a machine learning model to perform activity recognition according to one or more aspects. As shown in FIG. 2, the system includes a camera 202, a video labeler 204, labeled videos 206, an annotations database 212, a data augmenter 208, a pre-processor 214, a motion detector 210, a convolutional neural network (CNN) 216, and a post-processor 218. In some other implementations, one or more of the components 202-218 may be optional or one or more additional components, such as a training data generator, may be included in the system 200.

The camera 202 (e.g., one or more cameras) may capture a video stream of a pipe on an oil rig. In some implementations, the camera 202 may include or correspond to the camera 134 of FIG. 1. The video stream captured by the camera 202 may include a scene (e.g., an area) of the oil rig surrounding the pipe. The video labeler 204 may receive video data representing multiple video clips from the camera 202 and enable labeling of the video clips. In some implementations, the video labeler 204 may label each video clip based on user input. To illustrate, to enable activity recognition, a user may indicate whether each video clip depicts an activity (e.g., movement of the pipe) or no activity (e.g., no movement of the pipe). Based on the user input, the video labeler 204 may assign a label to each video clip, each label including a category, name, or class (e.g., movement or no movement). Assigning labels to the video clips received from the camera 202 generates the labeled videos 206. The labeled videos 206 may be provided to the data augmenter 208 and to the annotations database 212. The annotations database 212 may be configured to store video data corresponding to labeled video clips.

The data augmenter 208 may generate additional labeled video clips (e.g., synthesized video clips) based on the labeled videos 206 and labeled video clips from the annotations database 212. To generate the additional labeled videos, the data augmenter 208 may perform one or more modification operations on the labeled videos 206 or the labeled video clips from the annotations database 212. The modification operations may include operations to flip, rotate, translate, shear, rescale, resize, reshape, apply noise, filter, and the like, frames of input video clips to generate the additional labeled video clips. The labeled videos 206, the labeled video clips from the annotations database 212, and the additional labeled video clips generated by the data augmenter 208 may be provided to the pre-processor 214. The pre-processor 214 may apply pre-processing operations to the received labelled video clips. For example, the pre-processor 214 may apply a contrast limited adaptive histogram equalization (CLAHE) filter to the received labeled video clips, normalize pixel values (e.g., intensities, color values, or the like) between frames of the received labeled video clips, resize frames of the received labeled video clips such that all frames have the same size, or a combination thereof, as non-limiting examples. In some implementations, the pre-processor 214 may include or correspond to the pre-processor 122 of FIG. 1. The processed labeled video clips may be provided to the motion detector 210.

The motion detector 210 may detect motion between frames of the processed labeled video clips received from the pre-processor 214. In some implementations, the motion detector 210 may determine differences between intensity values associated with a set of pixels from a first frame of a video clip and the set of pixels from a second frame of the video clip, and if the differences satisfy a threshold, motion is detected. In some implementations, the motion detector 210 may include or correspond to the motion detector 124 of FIG. 1.

The processed labeled video clips (and the output of the motion detector 210) are used to generate training data for the CNN 216. In some implementations, the CNN 216 may include or correspond to the ML models 126 of FIG. 1. The training data may include features extracted from the processed labeled video clips and the corresponding labels, and the CNN 216 may be trained to determine whether the pipe is moving (e.g., recognize activity) based on features of video clips. Outputs indicating the determinations performed by the CNN 216 may be provided to the post-processor 218 for performance of one or more post-processing operations, such as applying a low-pass filter to discard high-frequency determinations of transitions between movement and non-movement. In some implementations, the post-processor may include or correspond to the post-processor 128 of FIG. 1. After training the CNN 216 and post-processing by the post-processor 218, validation data may be provided to the system 200 to test the accuracy of the system 200. For example, labeled video clips may be provided, without labels, to the pre-processor 214 for processing by the pre-processor 214, the motion detector 210, the CNN 216, and the post-processor 218, and the outputs may be compared to the corresponding labels to determine the accuracy of the system 200 (e.g., the CNN 216). If the accuracy fails to satisfy a threshold, additional training may be performed.

Figure 3:
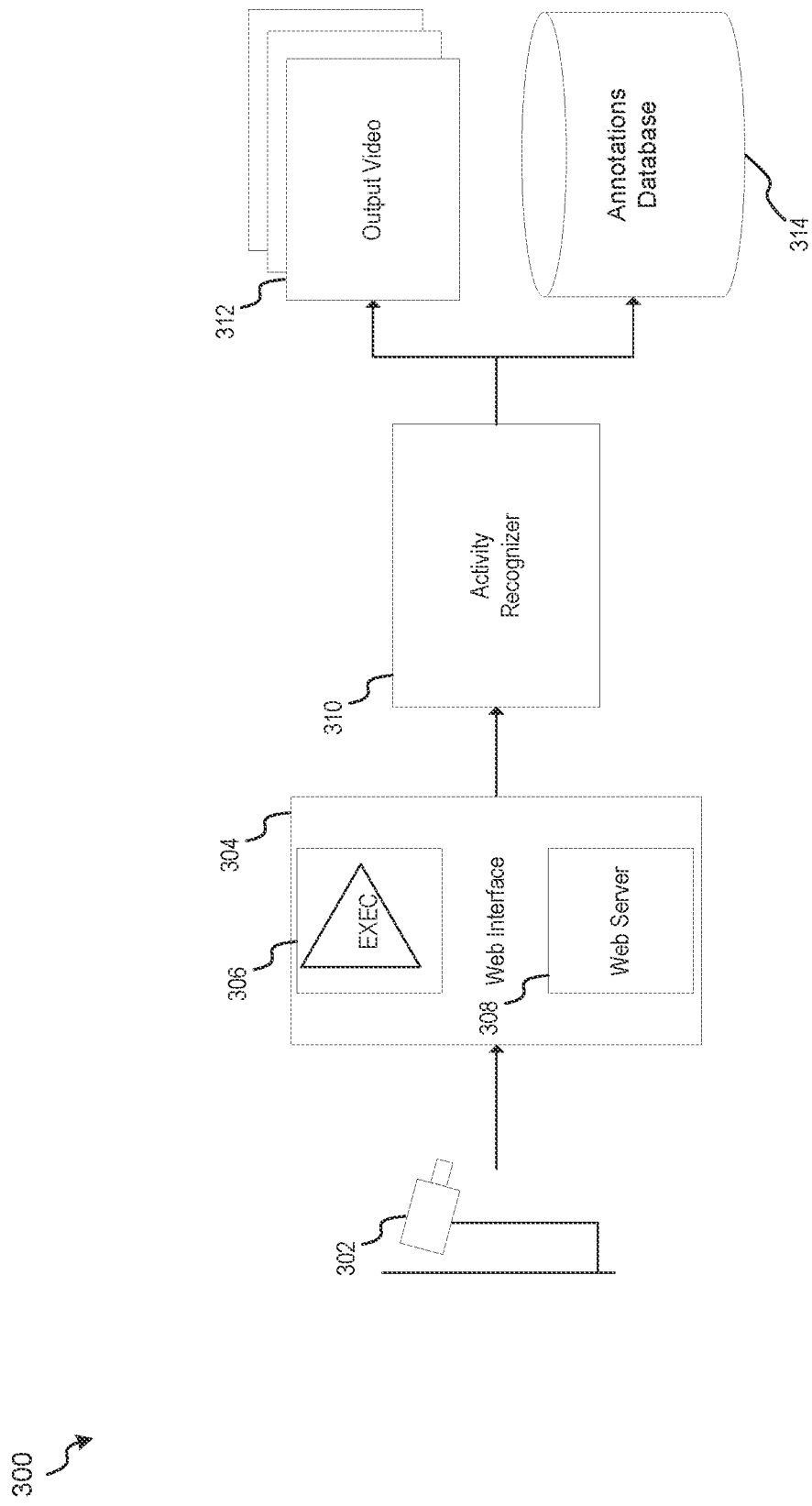
FIG. 3 is a block diagram of an example of a system that supports performing activity recognition using machine learning according to one or more aspects.

FIG. 3 illustrates an example of a system 300 that supports performing activity recognition using machine learning. As shown in FIG. 3, the system includes a camera 302, a web interface 304, an activity recognizer 310, one or more output videos 312, and an annotations database 314. In some other implementations, one or more of the components 302-314 may be optional or one or more additional components may be included in the system 300.

The camera 302 (e.g., one or more cameras) may capture a video stream for use in enabling activity recognition. In a particular, non-limiting example, the camera 302 may be configured to capture a video stream of a pipe on an oil rig. The video stream captured by the camera 302 may include a scene (e.g., an area) of the oil rig surrounding the pipe. For example, the camera 302 may be a security camera that is configured to monitor an area surrounding the pipe (or that is repurposed from monitoring other area(s) to monitoring the area surrounding the pipe). In some implementations, the camera 302 may include or correspond to the camera 134 of FIG. 1.

The web interface 304 may provide an interface, such as an application programming interface (API), between the camera 302 and the activity recognizer 310. For example, the web interface 304 may enable receipt and formatting of video data received via the Internet (or another network) from the camera 302. In some implementations, the web interface 304 includes one or more executables 306 (e.g., instructions, modules, or the like) and a web server 308. The executables 306 may be executed by a processor, such as a processor of the web server 308 or a processor associated with the activity recognizer 310, to cause performance of operations of the web interface 304. The web server 308 may be configured to host a website for interfacing with the activity recognizer 310, such as a website (or web portal or the like) that receives and optionally stores video data.

The activity recognizer 310 may be configured to recognize activity based on received video data from the web interface 304. In some implementations, the activity recognizer 310 may be configured to detect motion in frames of the video data. For example, the activity recognizer 310 may determine differences between intensity values associated with a set of pixels from a first frame of a video clip and the set of pixels from a second frame of the video clip, and if the differences satisfy a threshold, motion is detected, as further described with reference to FIG. 1. To further illustrate, in some implementations the system 300 may include the motion detector 210 of FIG. 2 between the web interface 304 and the activity recognizer 310. The activity recognizer 310 may be configured to determine whether the recognize activity based on the video data (e.g., based on frames for which motion is detected, if the activity recognizer 310 performs motion detection). For example, the activity recognizer 310 may determine whether the received video data corresponds to a pipe moving (e.g., on an oil rig). In some implementations, the activity recognizer 310 may include or have access to a CNN or another type of ML model. Outputs indicating determinations made by the activity recognizer 310 may be used to label the output videos 312 (e.g., such as corresponding to movement or no movement of the pipe). The output videos 312 may be displayed to a user via a GUI that indicates a slip to slip interval and that displays at least one video clip (e.g., a video clip corresponding to the slip to slip interval). Additionally, the output videos 312 (or the labels and identifiers thereof) may be stored in the annotations database 314. In some implementations, the annotations database 314 may include or correspond to the annotations database 212 of FIG. 2.

Figure 4:
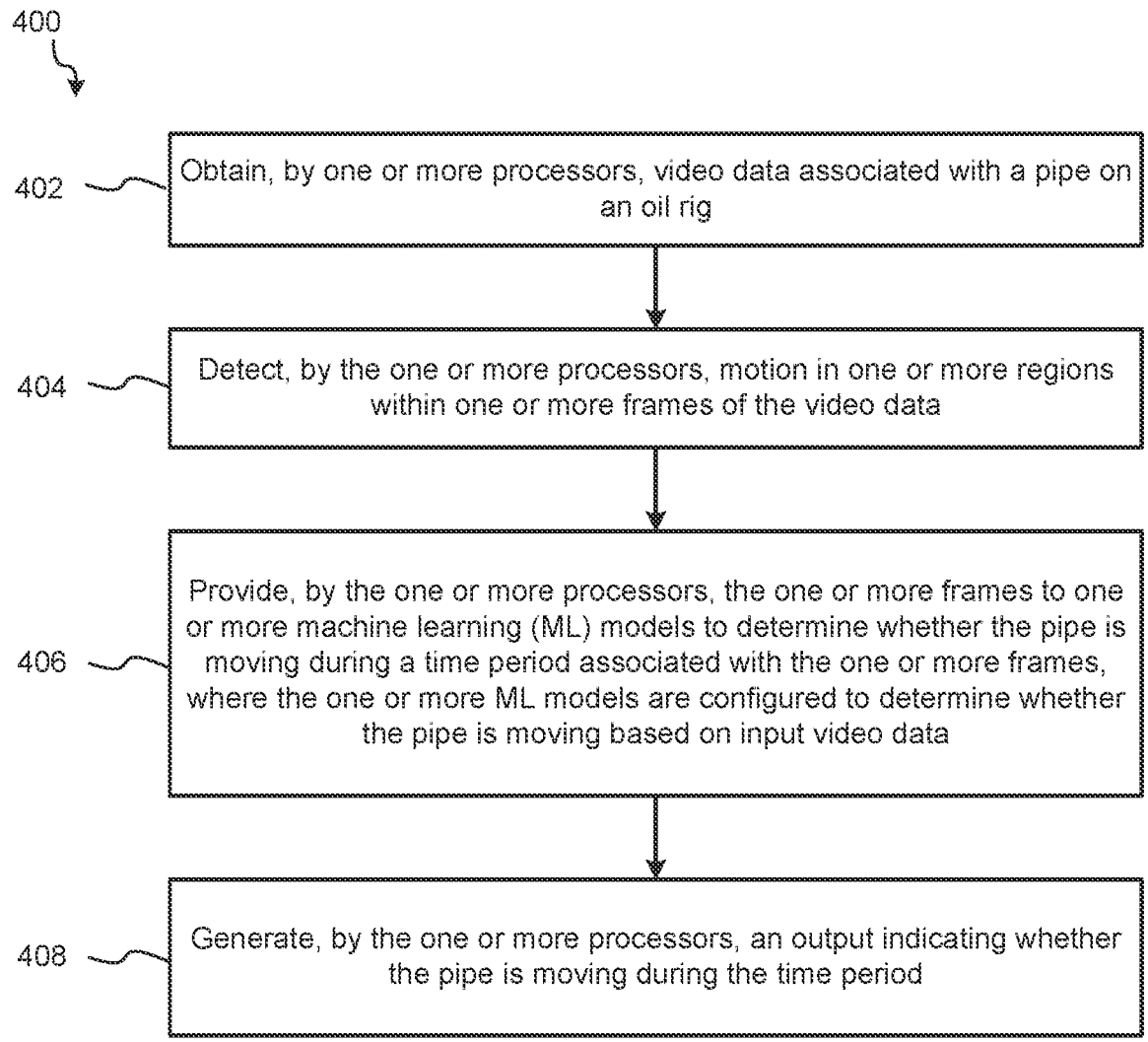
FIG. 4 is a flow diagram illustrating an example of a method for detecting motion of a pipe of an oil rig based on video analysis and machine learning according to one or more aspects.

Referring to FIG. 4, a flow diagram of an example of a method for detecting motion of a pipe of an oil rig based on video analysis and machine learning according to one or more aspects is shown as a method 400. In some implementations, the operations of the method 400 may be stored as instructions that, when executed by one or more processors (e.g., the one or more processors of a monitoring device or a server), cause the one or more processors to perform the operations of the method 400. In some implementations, the method 400 may be performed by a monitoring device, such as the monitoring device 102 of FIG. 1 (e.g., a monitoring device external to or integrated in a control system of an oil rig).

The method 400 includes obtaining video data associated with a pipe on an oil rig, at 402. For example, the video data may include or correspond to the video data 150 of FIG. 1, the pipe may include or correspond to the pipe 132 of FIG. 1, and the oil rig may include or correspond to the oil rig 130 of FIG. 1. The method 400 includes detecting motion in one or more regions within one or more frames of the video data, at 404. For example, the one or more frames of the video data may include or correspond to the identified frames 110 of FIG. 1.

The method 400 includes providing the one or more frames to one or more ML models to determine whether the pipe is moving during a time period associated with the one or more frames, at 406. The one or more ML models are configured to determine whether the pipe is moving based on input video data. For example, the one or more ML models may include or correspond to the ML models 126 of FIG. 1. The method 400 further includes generating an output indicating whether the pipe is moving during the time period, at 408. For example, the output may include or correspond to the output 152 of FIG. 1.

In some implementations, the one or more ML models include a CNN that includes three convolutional layers, three spatial dropout layers, and three fully connected layers. For example, the ML models 126 of FIG. 1 may include three convolutional layers, three spatial dropout layers, and three fully connected layers. Additionally or alternatively, determining whether the pipe is moving may be performed in real-time.

In some implementations, the method 400 may further include initiating display of a UI based on the output. The UI may be configured to display a duration of a time internal between consecutive movements of the pipe. For example, the monitoring device 102 of FIG. 1 may transmit the output 152 to the display device 138 to cause display of a UI that includes the time interval 116.

In some implementations, the method 400 may further include generating an alert based on the output or a command for an automated oil rig control system based on the output. For example, the alert or the command may include or correspond to the alert or command 154 of FIG. 1. Additionally or alternatively, detecting motion in the one or more regions within the one or more frames may include detecting differences between intensity values associated with a set of pixels in a first frame of the one or more frames and intensity values associated with the set of pixels in a second frame of the one or more frames. For example, the intensity values associated with the set of pixels may include or correspond to pixel intensities 114 of FIG. 1.

In some implementations, obtaining the video data may include receiving the video data from one or more cameras associated with the oil rig. The one or more cameras may include or correspond to the camera 134 of FIG. 1. Additionally or alternatively, the method 400 may further include performing one or more pre-processing operations on the video data prior to detecting the motion. The one or more pre-processing operations include applying a CLAHE filter to the video data, normalizing pixel values of the video data, resizing at least one frame of the video data, or a combination thereof. For example, the pre-processor 122 of FIG. 1 may perform the one or more pre-processing operations on the video data 150.

In some implementations, the method 400 may further include performing one or more post-processing operations on the video data after determining whether the pipe is moving. The post-processing operations may include applying a low-pass filter to batches of frames of the video data to discard high-frequency transitions between movement and non-movement of the pipe and identifying a transition by reanalyzing a respective mean of each of two batches of frames based on an overall indication of transition associated with the two batches of frames. For example, the post-processor 128 of FIG. 1 may perform the one or more post-processing operations after generation of the movement indication 112.

In some implementations, the method 400 may further include obtaining a first plurality of labeled video clips of movement of the pipe and a second plurality of labeled video clips of the pipe remaining stationary, generating a third plurality of labeled video clips by performing one or more image modification operations on the first plurality of labeled video clips, the second plurality of labeled video clips, or both, generating training data based on the first plurality of labeled video clips, the second plurality of labeled video clips, and the third plurality of labeled video clips, and providing the training data to the one or more ML models to train the one or more ML models to determine whether the pipe is moving based on the input video data. For example, the training data may include or correspond to training data 118 of FIG. 1

As described above, the method 400 supports activity recognition using image/video analysis (e.g., computer vision) and machine learning. For example, the method 400 may determine whether a pipe is moving (e.g., recognize activity) based on video data. Determining when the pipe is moving, and intervals between time periods of movement (e.g., the slip to slip time), may enable an entity that operates an oil rig to determine the effectiveness of operations at the oil rig, such as operations manually performed by workers or performed by an automated or semi-automated system.

In some aspects, the above-described techniques may be utilized in the context of oil rigs or other industrial machinery or manufacturing equipment. One illustrative use of the above-described techniques is to facilitate the determination of key performance indicators (KPIs) for the oil rig (or other industrial machinery). KPIs measure if a particular process or action is effectively accomplishing defined goals for an entity that implements the particular process or action. One of the main KPIs associated with offshore oil rigs is the slip to slip connection time. The slip to slip connection time refers to an amount of time (e.g., a time interval) from securing a first drill pipe to an oil rig, via a slip, to disconnecting the slip from the first drill pipe. The slip is disconnected from the first drill pipe after a second drill pipe is connected to the first drill pipe while the first drill pipe is secured via the slip. Conventional sensors on the oil rig may measure the overall time of an entire slip to slip process (e.g., a rig worker retrieving the slip, connecting the slip to the first drill pipe to stop movement of the first drill pipe, connection of the second drill pipe to the first drill pipe, removal of the slip, and completion of movement of the first drill pipe and the second drill pipe). However, these sensors do not measure whether the pipe (e.g., the first drill pipe) is moving, and thus are unable to provide sufficient information to break the slip to slip process into smaller activities or to determine the status of the pipe (e.g., whether the pipe is moving or not). Thus, conventional sensors may not provide sufficient granularity of information relating to the slip to slip process to enable determination of the KPI. One illustrative benefit of identifying the pipe status and other activities that compose the whole slip to slip process is the ability to analyze and determine how to improve the KPI.

Many oil rigs (and other industrial machinery) already have cameras for other purposes, such as security monitoring. Additionally, activity recognition using digital image processing techniques is beginning to be explored. In view of this, the present disclosure provides machine learning and digital video processing systems and methods for performing activity recognition, particularly for recognizing movement of a pipe, at an oil rig. The movement of the pipe may be used to determine KPIs (e.g., the slip to slip time). Machine learning and digital image processing techniques may be applied to existing cameras of oil rigs to automatize the surveillance of KPIs to recognize activities.

To configure a system for recognizing the activities that constitute a slip to slip connection in offshore oil rigs, various activities may be defined. For example, an ML system may be configured to identify the following activities: an elevator going out of the scene, a pipe handler fixing the pipe on a rotatory table, an iron rough neck (IRN) advancing, the IRN torching the pipe, the IRN returning, the pipe going down through the hole, and the elevator going down. As the number of activities defined increases, the complexity of the problem (and the corresponding ML system) also increases. In this context, it has been determined that the state of the pipe (e.g., whether the pipe is moving or not) is more useful for improving performance than recognition of each of the smaller activities described above. Each of the activities may be mapped to the two main states (e.g., pipe moving or pipe not moving): the elevator going out of the scene, the pipe handler fixing the pipe on the rotatory table, the IRN advancing, the IRN torching the pipe, and the IRN returning may correspond to the pipe not moving, and the pipe going down through the hole and the elevator going down may correspond to the pipe moving. Pipe not moving may be defined as the default state activity, even if there is no pipe in the scene. Defining the activities to be recognized may be important for use in supervised learning. To illustrate, supervised ML models typically require a ground truth from which the models learn. For this specific problem (e.g., determining the KPI of slip to slip time at the oil rig), training of ML models may be based on labeled video clips that depict the pipe moving and not moving (e.g., remaining stationary).

Activity recognition may be performed using computing vision. In video analytics, a video clip of an activity may be defined by a start time, end time, and a label (category, name, class, etc.) for assigning such activity to the video clip. For detecting activities, detecting movement information through video scenes may be valuable. Computer vision techniques may be performed to extract the pattern of apparent motion of objects, surfaces, and edges in a visual scene. Such patterns may be caused by relative motion between the source camera and the actual scene. As a non-limiting example, the patterns of motion may be extracted from video data using Optical Flow (or another application or algorithm). An output generated based on the video data may indicate (e.g., highlight) what is different from frame to frame in the video data: the higher the difference of intensity for the same pixel between frames, the higher the color intensity in a defined color map (which indicates pixels associated with motion). In the context of detecting movement of a pipe of an oil rig, detecting motion in this manner may be highly successful for scenes where only the pipe is moving (e.g., heavy machines are not moving).

To determine movement of the pipe (with optional motion detection), ML models may be used. One type of ML model is an artificial neural network (ANN). ANNs typically consist of connected layers of artificial neurons, where each neuron operates as a computing unit. Learning, in the context of ANNs, means adjusting the weight of each neuron for each computation, such as by forward and back propagating information through the network. ANNs may include a large number of neurons and connections, and thus may be complex. One of the most popular types of ANNs is the convolutional neural network (CNN). CNNs are commonly deep, i.e., they include many hidden layers for extracting features (e.g., for deep learning). Convolutions may be described as filter (or kernel) operations of several sizes to detect and extract "thin" features and rough structures of patterns in the learning dataset. CNNs are quite successful at solving detection and estimation problems, such as pattern mapping in images.

One challenging perception problem for computer vision is activity recognition. Activity recognition may require the understanding of features in frames, and relationship between features over time. Multiple different ML models for solving this task may be implemented. As two non-limiting examples, a CNN may be used for extracting features from frames and a long short-term memory (LSTM) network may be used for determining (e.g., recognizing) the activity. In other implementations, other types of ML models may be implemented.

The system for determining motion of the pipe at the oil rig may include, as a core component, a custom artificial neural network for recognizing activities. Additionally, the system may implement a newly-configured architecture and include auxiliary tools setting up the system online. Such tools may include a web platform, an application programming interface (API), communication tools (e.g., using Apache Pulsar, as a non-limiting example), libraries for pre-processing and streaming video data, tools for automatically setting up and shutting down the machines, and the like. The architecture may implement the concept of distributed and independent computing nodes communicating through the network.

In some implementations, the system includes a tool or application for labeling video clips. The tool may be configured to handle the opening and playing of local videos, in addition to setting up keyboard shortcuts for each activity to be recognized in the video. In some implementations, the tool may display a GUI that includes a video, a configuration of activities and corresponding shortcuts, and information for the activities in the video clip (e.g., the activity label, the begin time, the end time, etc.). Some of the video clips that may be labeled using the tool correspond to the pipe moving, while others correspond to the pipe not moving. Using the tool for labeling video clips may decrease the amount of time a user spends labeling video clips compared to using conventional video processing applications.

In some implementations, to reduce the amount of time a user spends labeling video clips, the system may perform data augmentation to supplement video labeling to increase the size of the labeled datasets (e.g., the labeled video clips). Data augmentation typically consists of applying different operators to the original dataset to increase the number of labeled examples. To illustrate, the system may perform operations that include horizontal flipping, rotating, translating, shearing, rescaling, resizing, reshaping, applying noise, applying filters, or the like to the labeled video clips to generate additional labeled video clips with minimal, or no, user input.

To improve or ensure consistency and improve feature extraction by the system, the system may perform digital image pre-processing based on the video clips. The digital image pre-processing may include applying a CLAHE filter, applying Optical Flow, normalizing pixel values, resizing frames to have the same size, other pre-processing, or a combination thereof. In some implementations, these operations may be performed using an open source library, such as the opencv library for python$^2$, as a non-limiting example. In some implementations, the pipe is to be centralized in the video clips to enable more efficient performance of the pre-processing (or determining the movement). In some other implementations, the video clips may be pre-processed such that the pipe is located in a different fixed location in the scene.

As described above, the system may include or have access to one or more ML models that are trained to determine whether the pipe is moving in a video clip. In some implementations, temporal information may be extracted using motion detection, and activity may be predicted using a custom ML model. In some implementations, the ML model may include or correspond to a CNN that includes three different convolutional layers, each followed by a spatial dropout layer, and three fully connected layers. In some other implementations, the system may include or have access to a first ANN trained to extract temporal features from the video clip (e.g., instead of the motion detection without a ML model) combined with an LSTM neural network. In some other implementations, the system may include or have access to a three-dimensional (3D) ANN (e.g., an ANN configured to also take into account time). The CNN including the above described layers may be associated with a desired combination of accuracy and complexity as compared to the other types of ML models. The ML model may be trained using training data based on labeled video clips (e.g., video clips labeled by a user, labeled video clips generated by data augmentation, or a combination thereof).

In some implementations, the system may be configured to perform one or more post-processing operations after determination of whether the pipe is moving (e.g., activity recognition). One illustrative post-processing operation may include using a low-pass filter to discard high frequency transitions of activity. The system may perform this analysis automatically on batches of three processed frames from the video data. For every two of those batches, if the overall agreement is towards a transition, re-analyzation of the means of both batches may be performed on the transition. In some other implementations, the post-processing operations may include other operations, such as labeling the video data, cutting video data (or portions thereof) that include motion (or that do not include motion), and the like.

Experimental tests based on one or more aspects of the present disclosure follow. For the experimental tests, an input dataset is received that includes approximately 3050 video clips depicting the pipe moving and 1050 video clips depicting the pipe not moving. Data augmentation is performed, and following the data augmentation, the final dataset includes approximately 24,000 total video clips balanced between video clips depicting the pipe moving and video clips depicting the pipe not moving. The video clips are divided into approximately 21,000 video clips for training data and approximately 3,000 video clips for validation (e.g., testing) data. The experimental tests indicate that the ML model (e.g., the above-described CNN) achieves approximately 99.6% accuracy on the validation data. Further, the tests indicate that, in a video in which the pipe transitions between moving and not moving three times, the movement (or the transition) detected by the system is detected within approximately 0 to 4 seconds of movement detected by visual inspection by a human.

Thus, the systems and methods described herein enable automatic recognition, measurement, and analysis of time consuming activities on oil rigs using video data (e.g., from a security camera) for input to a computer vision system. Such measurements may result in identifying issues and improving the performance of oil rig activities. The systems and methods described herein may reduce the computing time, reaching real-time/substantially real-time processing on the rig while achieving high standard performance on preliminary results (e.g., 99.6% overall accuracy). It is noted that the experiments and results described above were performed using videos from a single oil rig. Configuring the system for use with other oil rigs may include additional training of the ML model using a small labeled dataset from the other oil rigs (this process is called transfer learning). Additionally or alternatively, the system may be configured to expand the number of activities that are recognized for further exploring the slip to slip connection time. Additionally or alternatively, the system may be configured to recognize other activities. As a non-limiting example, the system may be configured to detect and track employees on the oil rig for safety issues, such as for use in defining and monitoring a danger zone. In some such examples, a user may specify an area of the oil rig which is forbidden to employees, and the system may be configured to determine whether an employee enters the danger zone and trigger an alarm based on the determination.

It is noted that other types of devices and functionality may be provided according to aspects of the present disclosure and discussion of specific devices and functionality herein have been provided for purposes of illustration, rather than by way of limitation. It is noted that the operations of the method 400 of FIG. 4 may be performed in any order, or that operations of one method may be performed during performance of another method. It is also noted that the method 400 of FIG. 4 may also include other functionality or operations consistent with the description of the operations of the system 100 of FIG. 1, the system 200 of FIG. 2, or the system 300 of FIG. 3.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-4) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for detecting motion of a pipe of an oil rig based on video analysis and machine learning, the method comprising:
   obtaining, by one or more processors, video data associated with a pipe on an oil rig;
   detecting, by the one or more processors, motion in one or more regions within one or more frames of the video data;
   providing, by the one or more processors, the one or more frames to one or more machine learning (ML) models to determine whether the pipe is moving during a time period associated with the one or more frames,
      wherein the one or more ML models comprise a convolutional neural network (CNN) comprising three convolutional layers, three spatial dropout layers, and three fully connected layers,
      wherein the one or more ML models are configured to determine whether the pipe is moving based on input video data; and
   generating, by the one or more processors, an output indicating whether the pipe is moving during the time period.

2. The method of claim 1, wherein determining whether the pipe is moving is performed in real-time.

3. The method of claim 1, further comprising initiating, by the one or more processors, display of a user interface (UI) based on the output,
   wherein the UI is configured to display a duration of a time interval between consecutive movements of the pipe.

4. The method of claim 1, further comprising generating, by the one or more processors, an alert based on the output or a command for an automated oil rig control system based on the output.

5. The method of claim 1, wherein detecting the motion in the one or more regions within the one or more frames comprises detecting differences between intensity values associated with a set of pixels in a first frame of the one or more frames and intensity values associated with the set of pixels in a second frame of the one or more frames.

6. The method of claim 1, wherein obtaining the video data comprises receiving, by the one or more processors, the video data from one or more cameras associated with the oil rig.

7. The method of claim 1, further comprising performing, by the one or more processors, one or more pre-processing operations on the video data prior to detecting the motion,
wherein the one or more pre-processing operations comprise applying a contrast limited adaptive histogram equalization (CLAHE) filter to the video data, normalizing pixel values of the video data, resizing at least one frame of the video data, or a combination thereof.

8. The method of claim 1, further comprising performing, by the one or more processors, one or more post-processing operations on the video data after determining whether the pipe is moving,
wherein the one or more post-processing operations comprise:
applying a low-pass filter to batches of frames of the video data to discard high-frequency transitions between movement and non-movement of the pipe; and
identifying a transition by reanalyzing a respective mean of each of two batches of frames based on an overall indication of transition associated with the two batches of frames.

9. The method of claim 1, further comprising:
obtaining, by the one or more processors, a first plurality of labeled video clips of movement of the pipe and a second plurality of labeled video clips of the pipe remaining stationary;
generating, by the one or more processors, a third plurality of labeled video clips by performing one or more image modification operations on the first plurality of labeled video clips, the second plurality of labeled video clips, or both;
generating, by the one or more processors, training data based on the first plurality of labeled video clips, the second plurality of labeled video clips, and the third plurality of labeled video clips; and
providing, by the one or more processors, the training data to the one or more ML models to train the one or more ML models to determine whether the pipe is moving based on the input video data.

10. A system for detecting motion of a pipe of an oil rig based on video analysis and machine learning, the system comprising:
a camera configured to capture video data associated with a pipe on an oil rig;
a memory; and
one or more processors communicatively coupled to the memory and the camera, the one or more processors configured to:
receive the video data from the camera;
detect motion in one or more regions within one or more frames of the video data;
provide the one or more frames to one or more machine learning (ML) models to determine whether the pipe is moving during a time period associated with the one or more frames,
wherein the one or more ML models comprise a convolutional neural network (CNN) comprising three convolutional layers, three spatial dropout layers, and three fully connected layers,
wherein the one or more ML models are configured to determine whether the pipe is moving based on input video data; and
generate an output indicating whether the pipe is moving during the time period.

11. The system of claim 10, wherein the motion in the one or more regions within the one or more frames is detected based on differences between intensity values associated with a set of pixels in a first frame of the one or more frames and intensity values associated with the set of pixels in a second frame of the one or more frames.

12. The system of claim 10, wherein the output further comprises an instruction to an automated oil rig control system to control a position of the pipe.

13. The system of claim 10, wherein the output further comprises frames of the video data corresponding to a time interval between consecutive movements of the pipe, the time interval corresponding to a slip to slip connection time.

14. A non-transitory computer-readable storage medium storing instructions that, when executed by one or more processors, cause the one or more processors to perform operations for detecting motion of a pipe of an oil rig based on video analysis and machine learning, the operations comprising:
obtaining video data associated with a pipe on an oil rig;
detecting motion in one or more regions within one or more frames of the video data;
providing the one or more frames to one or more machine learning (ML) models to determine whether the pipe is moving during a time period associated with the one or more frames,
wherein the one or more ML models are configured to determine whether the pipe is moving based on input video data;
performing one or more post-processing operations on the video data after determining whether the pipe is moving,
wherein the one or more post-processing operations comprise:
applying a low-pass filter to batches of frames of the video data to discard high-frequency transitions between movement and non-movement of the pipe, and
identifying a transition by reanalyzing a respective mean of each of two batches of frames based on an overall indication of transition associated with the two batches of frames; and
generating an output indicating whether the pipe is moving during the time period.

15. The non-transitory computer-readable storage medium of claim 14, wherein the operations further comprise providing training data to the one or more ML models to train the one or more ML models to determine whether the pipe is moving based on the input video data,
wherein the training data is based on a first plurality of labeled video clips containing movement of the pipe and a second plurality of labeled video clips containing the pipe remaining stationary.

16. The non-transitory computer-readable storage medium of claim 15, wherein the operations further comprise performing one or more rotating, scaling, resizing, or filtering operations on the first plurality of labeled video clips, the second plurality of labeled video clips, or both, to generate a third plurality of labeled video clips,
wherein the training data is based further on the third plurality of labeled video clips.

17. The non-transitory computer-readable storage medium of claim 14, wherein the operations further comprise performing one or more pre-processing operations on the video data prior to detecting the motion, wherein the one or more pre-processing operations comprise applying a contrast limited adaptive histogram equalization (CLAHE) filter to the video data, normalizing pixel values of the video data, resizing at least one frame of the video data, or a combination thereof.

18. The non-transitory computer-readable storage medium of claim 14, wherein the operations further comprise applying a contrast limited adaptive histogram equalization (CLAHE) filter to the video data prior to detecting the motion.

* * * * *